United States Patent
Baltes et al.

(10) Patent No.: US 8,959,905 B2
(45) Date of Patent: Feb. 24, 2015

(54) HYDROSTATIC DRIVE SYSTEM

(75) Inventors: Herbert Baltes, Loshelm (DE); Frank Bauer, Marpingen (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 821 days.

(21) Appl. No.: 12/998,925

(22) PCT Filed: Nov. 25, 2009

(86) PCT No.: PCT/EP2009/008406
§ 371 (c)(1),
(2), (4) Date: Jun. 16, 2011

(87) PCT Pub. No.: WO2010/072299
PCT Pub. Date: Jul. 1, 2010

(65) Prior Publication Data
US 2011/0314801 A1    Dec. 29, 2011

(30) Foreign Application Priority Data

Dec. 23, 2008 (DE) .......................... 10 2008 062 836

(51) Int. Cl.
*F16H 61/448* (2010.01)
*F16H 61/4096* (2010.01)
*B60K 6/12* (2006.01)

(52) U.S. Cl.
CPC .............. *F16H 61/4096* (2013.01); *B60K 6/12* (2013.01); *F16H 61/448* (2013.01); *Y02T 10/6208* (2013.01)
USPC ............................................. 60/414; 60/416

(58) Field of Classification Search
CPC ..... F16H 61/4096; F16H 61/448; B60K 6/12; Y02T 10/6208; F15B 2211/625
USPC .................................................. 60/414, 416
See application file for complete search history.

(56) References Cited

U.S. PATENT DOCUMENTS

| 4,098,083 | A | | 7/1978 | Carman |
| 4,679,396 | A | * | 7/1987 | Heggie ............................. 60/414 |
| 4,760,697 | A | * | 8/1988 | Heggie et al. ................... 60/414 |
| 4,813,510 | A | * | 3/1989 | Lexen .............................. 60/414 |
| 6,719,080 | B1 | * | 4/2004 | Gray, Jr. .......................... 60/414 |
| 6,971,463 | B2 | * | 12/2005 | Shore et al. ................... 180/165 |
| 7,082,757 | B2 | * | 8/2006 | Teslak et al. ................... 60/414 |
| 7,870,727 | B2 | * | 1/2011 | Mueller et al. ................. 60/414 |
| 7,926,265 | B2 | * | 4/2011 | Mueller et al. ................. 60/414 |

FOREIGN PATENT DOCUMENTS

| DE | 10 2005 060 994 | 6/2007 |
| EP | 1 898 131 | 3/2008 |
| FR | 2 520 827 | 8/1983 |

* cited by examiner

*Primary Examiner* — Thomas E Lazo
(74) *Attorney, Agent, or Firm* — Roylance, Abrams, Berdo & Goodman, L.L.P.

(57) ABSTRACT

A hydrostatic drive system has a motor-driven hydraulic pump (1) connected to at least one hydraulic drive unit (7) by a first working line (19) and a second working line (21) forming a hydraulic circuit. The drive unit is connected to a gear set (1, 3). A first hydraulic accumulator (53) for accumulating pressure energy can be connected to one of the working lines (19, 21). A second hydraulic accumulator (55) can be connected to the other working line (19, 21). A valve device (V1, V2) permits the segment (23, 25) of each working line (19 or 21) extending to the drive unit (7) to be separated to separate an accumulator part (33) from the part of the circuit with the hydraulic pump (13). The accumulator part includes the hydraulic accumulators (53, 55) and at least one drive unit.

20 Claims, 1 Drawing Sheet

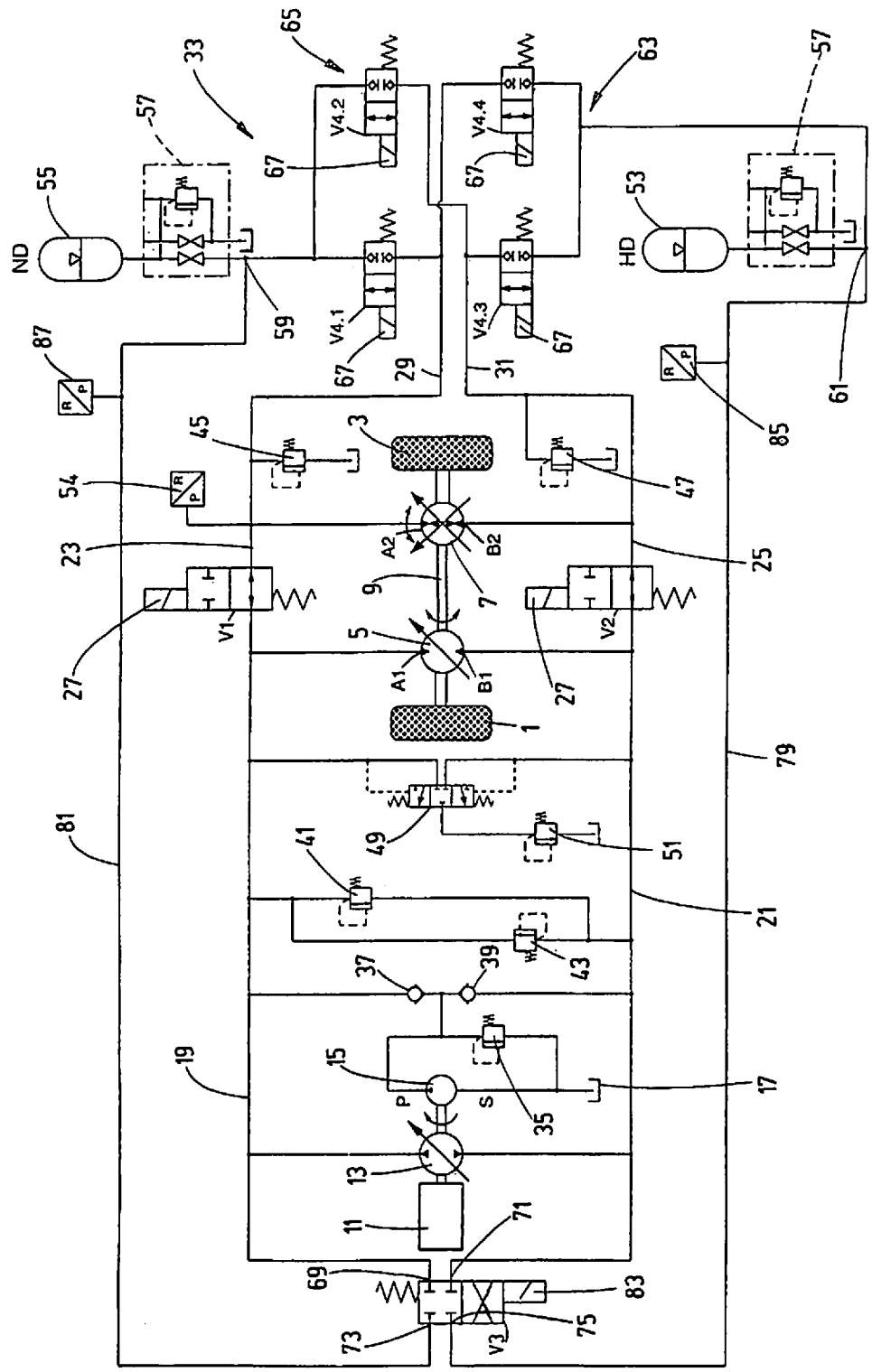

HYDROSTATIC DRIVE SYSTEM

FIELD OF THE INVENTION

The invention relates to a hydrostatic drive system having a motor-drivable hydraulic pump that can be connected to at least one hydraulic drive unit by first and second working lines forming a hydraulic circuit. One hydraulic accumulator, for recovery of stored pressure energy, can be connected to one of the working lines, and a second hydraulic accumulator can be connected to the other working line.

BACKGROUND OF THE INVENTION

Hydrostatic drives of this type, as are shown, for example, in document WO 2007/079935 A1, are often used in commercial vehicles like buses or mobile machinery. These drive systems offer the possibility of storing a part of the kinetic energy as pressure energy during braking processes and then recovering it to support acceleration processes. In this respect, the prior art provides for at least one drive unit to be set up as a hydraulic motor in the form of an adjustable motor-pump unit so that the hydraulic motor delivers hydraulic fluid in the overrun mode of the drive system. The delivery volume is supplied as a charging volume to the high pressure accumulator, with both a braking action in the drive unit and storage of pressure energy occurring in the high pressure accumulator. This energy can be recovered by the high pressure accumulator being connected to the working line assigned to the delivery side in the drive state for acceleration processes. In the respective working cycle for acceleration and braking, the second hydraulic accumulator—the low pressure accumulator—is connected to one of the working lines to equalize the volumes that have been removed or supplied to the respective other working line.

SUMMARY OF THE INVENTION

An object of the invention is to provide an improved drive system characterized by an especially simple structure of the hydraulic circuit and at the same time by an operating behavior improved relative to the prior art.

According to the invention, this object is basically achieved by a hydrostatic drive system having a valve device by which the segment of each working line extending to at least one drive unit can be separated in terms of operation. By separating these segments of the two working lines, the hydraulic circuit is divided into two component circuits, specifically into a part of the circuit containing the hydraulic pump and an accumulator part containing at least one drive unit and the hydraulic accumulator. In the normal drive state, that is, without acceleration or braking processes, there is no interruption of the working lines to the drive unit so that the drive unit is supplied from the hydraulic pump via the working lines. If an acceleration or braking process is to take place, the connections to the drive device are separated by the valve device. This separation means that the accumulator part is separated from the hydraulic circuit, and for acceleration and braking processes therefore only the portion of lines and hydraulic components that belongs to the accumulator part is involved. This arrangement yields not only the advantage of a good response behavior as a result of the stiffness of the line system encompassing only the accumulator part, thereby avoiding hysteresis phenomena, but the arrangement is also characterized by low flow losses due to the reduced line volumes through which the participating volumes are flowing.

In contrast, the aforementioned known solution involves no separation of an accumulator part that is active only during acceleration and braking in all operating states, and volumes of hydraulic fluid flow actively through the entire circuit. As a result, corresponding shifting losses and a correspondingly inert response behavior result.

In especially advantageous exemplary embodiments, two separate hydraulic drive units are dynamically connected to one another in terms of operation. By the valve device, the segment of each working line extending between the drive units can be separated. In acceleration and braking processes, after separation of the accumulator part in the other component circuit that, as a supply part, contains the hydraulic pump, a hydraulic drive unit also remains so that in acceleration processes both the drive unit belonging to the accumulator part is supported by the energy that has been recovered from the high pressure accumulator. At the same time, the drive unit belonging to the supply part is supplied by the hydraulic pump with drive energy. In effect, an addition of output from the output originating from the recovered pressure energy and the energy delivered by the hydraulic pump to the drive unit belonging to the supply circuit is thus produced.

The drive units can be mechanically coupled directly to one another, where the design is simple, for example, in traveling mechanisms. This coupling is not critical. An operating dynamic connection could alternatively take place via transmission and/or clutch devices or simply such that one or more gear sets of each drive unit roll on a common raceway or roadway. That is, the drive units are not dynamically connected to one another propulsively, but only by jointly rolling on a common raceway.

In preferred exemplary embodiments, the valve device, by which the accumulator part can be separated from the hydraulic circuit in each working line, has a directional switching valve preloaded into the open state and controllable by electromagnetic actuation into the blocked state.

With respect to the accumulator part, the accumulator part can have a second valve device connected to the first hydraulic accumulator used as a high pressure accumulator for storage of pressure energy, and can have a third valve device connected to the second hydraulic accumulator used as a low pressure accumulator. These second and third valve devices permit the accumulator part, when an acceleration or braking process is not taking place, to remain inactive as it were, by the two hydraulic accumulators being separated from the circuit by the second and third valve devices, which second and third valve devices are in the blocked state when separation of the accumulator part does not take place.

The second and the third valve devices of the accumulator part both have one acceleration valve each, which acceleration valve can be controlled into the open state for an acceleration process to connect the high pressure accumulator to the first working line, which connection causes the drive pressure supply of the drive unit belonging to the accumulator part and to connect the low pressure accumulator to the other, second working line for recovery of stored pressure energy. Furthermore, the second and the third valve devices of the accumulator part can both have one brake valve each that can be controlled into the open state for a braking process to connect the second working line, i.e., the working line belonging to the delivery side of the drive unit in the overrun mode, to the high pressure accumulator and to connect the other, first working line to the low pressure accumulator for storage of pressure energy.

Preferably, both acceleration valves and brake valves are each formed by directional valves that can be controlled into the open state by electromagnetic actuation and that are preloaded into the blocked state. Without electrical triggering, the accumulator part, including the hydraulic accumulator, the safety components conventionally assigned to the hydraulic accumulators and including the second and the third valve devices, is hydraulically separated from the rest of the circuit that is active in the normal operating state.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a symbolic hydraulic circuit diagram of a hydrostatic drive system according to an exemplary embodiment of the invention.

DETAILED DESCRIPTION OF THE INVENTION

The invention is described using the example of a traveling mechanism intended, for example, for use in buses, with two drive units 5 and 7 being connected to one gear set 1 and 3 each. The first drive unit 5 is a fixed displacement motor that can be operated in two directions of rotation according to two volumetric flow directions. The second drive unit 7 is formed by an adjustable motor pump, likewise for two volumetric flow directions, according to the two directions of rotation. In this exemplary embodiment, the first drive unit 5 and second drive unit 7 are directly coupled mechanically via a connecting shaft 9.

For the energy supply of the system, a primary drive is provided by an internal combustion engine, in this exemplary embodiment in the form of a diesel engine 11 that drives a hydraulic pump 13 in the form of an adjustable pump that, for the same direction of rotation, can deliver in two volumetric flow directions. A feed pump 15 in the form of a fixed displacement pump can be driven jointly with the hydraulic pump 13 and, as discussed below, enables resupply of the system with hydraulic fluid from a tank 17 to compensate for leak losses of the system. To form a hydraulic circuit, a first working line 19 and a second working line 21 are connected to the two ports of the hydraulic pump 13. Of the two lines, the first working line 19 is connected to a port A1 of the first drive unit 5, and the second working line 21 is connected to the other port B1 of the first drive unit 5. The working line 19 continues via a line segment 23 to the port A2 of the second drive unit 7, while the second working line 21 continues via a line segment 25 to the second port B2 of the second drive unit 7. In each of these line segments 23 and 25, a 2/2 directional valve V1 and V2 is provided. The directional valves V1, V2 are used as switching valves that, in the open state, clear the assigned line segment 23 and 25 or separate it in the blocked state. The directional valves V1 and V2 are mechanically preloaded into the open state and can be switched to the blocked state by electrical actuation of their actuating magnet 27.

An accumulator part 33 completes the entire hydraulic circuit and is connected via connecting lines 29 and 31 to the line segments 23 and 25 of the working lines 19 and 21.

The feed pump 15, whose delivery side is protected by a pressure limiting valve 35 toward the tank side, is connected on the delivery side via nonreturn valves 37 and 39 to the working lines 19 and 21 to ensure the filled state of the system. With respect to the system pressure prevailing in operation, pressure limiting valves 41 and 43 are connected between the working lines 19 such that a limitation of the maximum pressure difference between the working lines 19 and 21 takes place. To limit the system pressure in the accumulator connecting lines 29 and 31 connected to the line segments 23 and 25, further pressure limiting valves 45 and 47 are provided, each toward the tank side. Moreover, a 3/2 directional valve 49, which can be opened via control pressure from the working line 19 or the working line 21 by pressure actuation, enables discharge to the tank side via a pressure limiting valve 51 that limits the discharge pressure. A pressure-voltage converter 54 provides a signal for the pressure in the working line 19 on the line segment 23 of the working line 19, and thus, on the associated accumulator connecting line 29.

The accumulator part 33 has a high pressure accumulator 53 and a low pressure accumulator 55 to which a respective accumulator safety block 57 is connected upstream. The safety blocks 57 are made in the known manner that is conventional in these accumulator arrangements so that a more detailed description of the safety blocks 57 is unnecessary. A valve device 63 and 65 is connected to the input 59 and 61 of each safety block 57, each valve device 63 and 65 containing two 2/2 directional valves at a time. Specifically for the valve device 63 of the high pressure accumulator 53 one directional valve V4.3 and one directional valve V4.4 are provided. The valve device 65 has one directional valve V4.1 and one directional valve V4.2. All of these directional valves are mechanically preloaded into the blocked state and can be electrically controlled into the open state by triggering their actuating magnet 67.

FIG. 1 shows an operating state in which all electromagnetically controllable directional valves are de-energized. This state corresponds to the normal operating state of the system, without acceleration or braking. The directional valves V1 and V2 located in the line segments 23 and 25 of the working lines 19 and 21 are in the open state, while all directional valves that belong to the valve devices 63 and 65 of the accumulator part 33 are in the blocked state. The accumulator part 33 is therefore separated from the remaining circuit on the accumulator connecting lines 29 and 31. In the normal operating state, therefore the output of the drive units 5 and 7 is determined solely according to the delivery capacity of the hydraulic pump 13, where setting to a delivery capacity of zero can correspond to the pertinent vehicle at standstill.

To move the system into the initial operating state after the standstill of the vehicle, in which an acceleration process can take place with concomitant action of the accumulator part 33 for starting, a charging valve V3 in the form of a 4/2 directional valve has a first input 69 connected to the first working line 19 and a second input 71 connected to the second working line 21. Outputs 75 and 73 are connected via a first charging line 79 and a second charging line 81 to the input 61 on the high pressure accumulator 53 and the input 59 on the low pressure accumulator 55, respectively. Both accumulators 53, 55 can therefore be charged to the desired pressure level when the actuating magnet 83 of the charging valve V3 that is preloaded into the closed state is actuated. The pressure-signal converters 85 and 87 deliver a display of the charging pressures.

When an acceleration process is to take place, for example, for starting off from a stop, or for accelerating while driving, the actuating magnets 27 of the directional valves V1 and V2 are triggered to block these valves. In this way, the line segment 23 of the working line 19 and the line segment 25 of the working line 21 are separated from the respective working line. The accumulator part 33 to which the second drive unit 7 belongs is separated from the hydraulic circuit, therefore from a remaining part, specifically the supply part extending from the hydraulic pump 13 to the first drive unit 5. While in the illustrated exemplary embodiment having two drive units 5 and 7, at this point the hydraulic pump 13 continues to remain hydraulically connected to the first drive unit 5; and the activated accumulator part 33 is available for the desired acceleration process, with the energy that has been recovered from the high pressure accumulator 53 being supplied to the second drive unit 7. For this purpose, in the valve devices 63 and 65, those directional valves used as acceleration valves are controlled into the open state by energizing the magnets 67. In forward operation, the valve V4.4 in the valve device 63 and valve 4.2 in the valve device 65 are opened. In this way, via the accumulator connecting line 29, the high pressure accumulator 53 is connected to the port A2 of the second drive unit 7; and, via the accumulator connecting line 31, the low pressure accumulator 55 is connected to the other port B2 of the drive unit 7. Thus the pressure energy of the accumulator 53 acts via the pressure-side input of the drive unit 7, while the volumetric flow delivered on the low-pressure side from the drive unit 7 is supplied to the low pressure accumulator 55 via the accumulator connecting line 31.

If, in contrast, a braking process is to take place, in turn the directional valves V1 and V2 are closed and the accumulator part 33 therefore is separated from the supply circuit on the segments 23 and 25. The directional valves V4.3 and V4.1 used as braking valves and contained in the valve devices 63 and 65, respectively, of the accumulator part are controlled into the open state. Thus, the high pressure accumulator 53 is now connected to the port B2 of the drive unit 7, while the other port A2 is connected to the low pressure accumulator 55, so that the pressure energy stored in the high pressure accumulator 53 is recovered as deceleration energy that is active on the second drive unit 7.

The operating mode of the system described above is based on forward operation or driving forward. Since the hydraulic pump 13 is an adjustable pump so that two volumetric flow directions are possible, the system can be easily operated in reverse. Of the directional valves located in the valve devices 63 and 65 of the accumulator part 33, the directional valves V4.3 and V4.1 in reverse now act as acceleration valves, while the directional valves V4.4 and V4.2 now act as brake valves.

While there are two drive units 5 and 7 in the illustrated embodiment, only one drive unit could be used which is active both in the normal drive state and in acceleration and braking processes. In other words, in the description according to this FIGURE, the drive unit 5 could be omitted. Compared to this embodiment, however, the example described here is advantageous to the extent that both in the normal drive state, that is, with the valves V1 and V2 open and the accumulator part 33 inactive, the two drive units 5 and 7 are active; and that also with the valves V1 and V2 closed, the first drive unit 5 in the supply part of the circuit remains active and is activated accordingly by the hydraulic pump 13. Since the second drive unit 7 is an adjustable motor pump with two opposite volumetric flow directions, operation of the hydrostatic drive system is ensured even if the valve modules V4.1 and V4.3 or V4.2 and V4.4 are omitted.

While one embodiment has been chosen to illustrate the invention, it will be understood by those skilled in the art that various changes and modifications can be made therein without departing from the scope of the invention as defined in the appended claims.

What is claimed is:

1. A hydrostatic drive system, comprising:
a motor-drivable hydraulic pump;
first and second hydraulic drive units coupled to said hydraulic pump by first and second working lines forming a hydraulic circuit and dynamically coupled to one another operatively;
a gear set connected to said drive unit;
a first hydraulic accumulator for storage of pressure energy being connectable to said first working line;
a second hydraulic accumulator being connectable to said second working line; and
first and second valve devices in said first and second working lines, respectively, able to separate first and second segments of said first and second working lines, respectively, extending to and between said drive units to separate an accumulator part including said hydraulic accumulators and said drive unit from a part of said hydraulic circuit including said hydraulic pump.

2. A hydrostatic drive system according to claim 1 wherein
said first and second drive units are mechanically coupled to one another.

3. A hydrostatic drive system according to claim 1 wherein
each of said first and second valve devices comprises a directional valve preloaded to an open state thereof and controlled by an electromagnetic actuator for movement to a blocked state thereof.

4. A hydrostatic drive system according to claim 1 wherein
said accumulator part comprises a third valve device connected to said first hydraulic accumulator used as a high pressure accumulator and a fourth valve device connected to said second hydraulic accumulator used as a low pressure accumulator.

5. A hydrostatic drive system according to claim 4 wherein
each of said third and fourth valve devices comprises an acceleration valve controllable into an open state thereof for an acceleration process to recover stored pressure energy by connecting said high pressure accumulator to said first working line to cause a drive pressure supply of said second drive unit belonging to said accumulator part and by connecting said low pressure accumulator to said second working line.

6. A hydrostatic drive system according to claim 5 wherein
each of said third and fourth valve devices comprises a brake valve controllable into an open state thereof for a braking process by connecting said second working line to said high pressure accumulator and by connecting said first working line to said low pressure accumulator for storage of pressure energy.

7. A hydrostatic drive system according to claim 6 wherein
each of said acceleration valves and said brake valves comprise directional valves controllable into an open state thereof by an electromagnetic actuator and preloaded into a blocked state thereof.

8. A hydrostatic valve system according to claim 1 wherein
a recharging valve comprising a 4/2 directional valve preloaded into a blocked state thereof and controllable into an open state thereof by an electromagnetic actuator connects a high pressure side of said hydraulic pump to said first hydraulic accumulator used as a high pressure accumulator and a low pressure side of said hydraulic pump to said second hydraulic accumulator used as a low pressure accumulator.

9. A hydrostatic drive system, comprising:
a motor-drivable hydraulic pump;
at least one hydraulic drive unit coupled to said hydraulic pump by first and second working lines forming a hydraulic circuit;
a gear set connected to said drive unit;
a first hydraulic accumulator for storage of pressure energy being connectable to said first working line;
a second hydraulic accumulator being connectable to said second working line; and
first and second valve devices in said first and second working lines, respectively, able to separate first and second segments of said first and second working lines, respectively, extending to said drive unit to separate an accumulator part including said hydraulic accumulators and said drive unit from a part of said hydraulic circuit including said hydraulic pump, each of said first and second valve devices including a directional valve preloaded to an open state thereof and controlled by an electromagnetic actuator for movement to a blocked state thereof.

10. A hydrostatic drive system according to claim 9 wherein
said accumulator part comprises a third valve device connected to said first hydraulic accumulator used as a high pressure accumulator and a fourth valve device connected to said second hydraulic accumulator used as a low pressure accumulator.

11. A hydrostatic drive system according to claim 10 wherein
each of said third and fourth valve devices comprises an acceleration valve controllable into an open state thereof for an acceleration process to recover stored pressure energy by connecting said high pressure accumulator to said first working line to cause a drive pressure supply of said second drive unit belonging to said accumulator part and by connecting said low pressure accumulator to said second working line.

12. A hydrostatic drive system according to claim 11 wherein
each of said third and fourth valve devices comprises a brake valve controllable into an open state thereof for a braking process by connecting said second working line to said high pressure accumulator and by connecting said first working line to said low pressure accumulator for storage of pressure energy.

13. A hydrostatic drive system according to claim 12 wherein
each of said acceleration valves and said brake valves comprise directional valves controllable into an open state thereof by an electromagnetic actuator and preloaded into a blocked state thereof.

14. A hydrostatic drive system according to claim 9 wherein
a recharging valve comprising a 4/2 directional valve preloaded into a blocked state thereof and controllable into an open state thereof by an electromagnetic actuator connects a high pressure side of said hydraulic pump to said first hydraulic accumulator and a low pressure side of said hydraulic pump to said second hydraulic accumulator.

15. A hydrostatic drive system, comprising:
a motor-drivable hydraulic pump;
at least one hydraulic drive unit coupled to said hydraulic pump by first and second working lines forming a hydraulic circuit;
a gear set connected to said drive unit;
a first hydraulic accumulator for storage of pressure energy being connectable to said first working line;
a second hydraulic accumulator being connectable to said second working line; and
first and second valve devices in said first and second working lines, respectively, able to separate first and second segments of said first and second working lines, respectively, extending to said drive unit to separate an accumulator part including said hydraulic accumulators and said drive unit from a part of said hydraulic circuit including said hydraulic pump, said accumulator part including a third valve device connected to said first hydraulic accumulator and a fourth valve device connected to said second hydraulic accumulator used as a low pressure accumulator.

16. A hydrostatic drive system according to claim 15 wherein
each of said third and fourth valve devices comprises an acceleration valve controllable into an open state thereof for an acceleration process to recover stored pressure energy by connecting said high pressure accumulator to said first working line to cause a drive pressure supply of said second drive unit belonging to said accumulator part and by connecting said low pressure accumulator to said second working line.

17. A hydrostatic drive system according to claim 16 wherein
each of said third and fourth valve devices comprises a brake valve controllable into an open state thereof for a braking process by connecting said second working line to said high pressure accumulator and by connecting said first working line to said low pressure accumulator for storage of pressure energy.

18. A hydrostatic drive system according to claim 17 wherein
each of said acceleration valves and said brake valves comprise directional valves controllable into an open state thereof by an electromagnetic actuator and preloaded into a blocked state thereof.

19. A hydrostatic drive system according to claim 15 wherein
a recharging valve comprising a 4/2 directional valve preloaded into a blocked state thereof and controllable into an open state thereof by an electromagnetic actuator connects a high pressure side of said hydraulic pump to said first hydraulic accumulator and to a low pressure side of said hydraulic pump to said second hydraulic accumulator.

20. A hydrostatic drive system, comprising:
a motor-drivable hydraulic pump;
at least one hydraulic drive unit coupled to said hydraulic pump by first and second working lines forming a hydraulic circuit;
a gear set connected to said drive unit;
a first hydraulic accumulator for storage of pressure energy being connectable to said first working line;
a second hydraulic accumulator being connectable to said second working line;
first and second valve devices in said first and second working lines, respectively, able to separate first and second segments of said first and second working lines, respectively, extending to said drive unit to separate an accumulator part including said hydraulic accumulators and said drive unit from a part of said hydraulic circuit including said hydraulic pump; and
a recharging valve including a 4/2 directional valve preloaded into a blocked state thereof and controllable into an open state thereof by an electromagnetic actuator connecting a high pressure side of said hydraulic pump to said first hydraulic accumulator used as a high pressure accumulator and a low pressure side of said hydraulic pump to said second hydraulic accumulator used as a low pressure accumulator.

* * * * *